US006511738B2

(12) United States Patent
Koyama et al.

(10) Patent No.: US 6,511,738 B2
(45) Date of Patent: Jan. 28, 2003

(54) SUPPORT FOR ROLLED LIGHT-SENSITIVE PHOTOGRAPHIC MATERIAL

(75) Inventors: Hirokazu Koyama, Hino (JP); Toshiaki Shibue, Hino (JP)

(73) Assignee: Konica Corporation (JP)

( * ) Notice: Subject to any disclaimer, the term of this patent is extended or adjusted under 35 U.S.C. 154(b) by 6 days.

(21) Appl. No.: 09/770,950

(22) Filed: Jan. 26, 2001

(65) Prior Publication Data

US 2001/0033921 A1 Oct. 25, 2001

(30) Foreign Application Priority Data

Jan. 31, 2000 (JP) ....................................... 2000-021543

(51) Int. Cl.[7] .......................... B32B 27/08; B32B 27/36

(52) U.S. Cl. ....................... 428/216; 428/212; 428/213; 428/215; 428/216; 428/480; 430/271.1; 430/523; 430/531; 430/533

(58) Field of Search ................................ 428/480, 910, 428/212, 213, 215, 216, 903.3; 430/271.1, 523, 531, 533

(56) References Cited

U.S. PATENT DOCUMENTS 5,360,708 A * 11/1994 Takada et al. .............. 430/496
5,372,925 A * 12/1994 Kobayashi et al. ......... 428/215
5,387,501 A * 2/1995 Yajima et al. .............. 428/480
5,556,739 A * 9/1996 Nakanishi et al. .......... 430/533

FOREIGN PATENT DOCUMENTS

| | | |
|---|---|---|
| JP | 1244446 | 4/1989 |
| JP | 4-93937 | 3/1992 |
| JP | 06023929 | 2/1994 |
| JP | 06161035 | 6/1994 |
| JP | 06289534 | 10/1994 |

* cited by examiner

*Primary Examiner*—Vivian Chen
(74) *Attorney, Agent, or Firm*—Bierman, Muserlian and Lucas

(57) ABSTRACT

A support for rolled light-sensitive photographic materials is disclosed. The support is composed of at least three polyester films laminated, in which outer layers are comprised of copolyester; at least one interlayer is comprised of the mixture of said copolyester and homopolyester; the total film thickness is between 105 and 130 μpm; the total thickness of interlayers is between 45 and 85 μm; and the ratio of said copolyester in the mixture layer of said copolyester and said homopolyester is between 10 and 40 percent by weight.

21 Claims, No Drawings

SUPPORT FOR ROLLED LIGHT-SENSITIVE PHOTOGRAPHIC MATERIAL

FIELD OF THE INVENTION

The present invention relates to a support for rolled light-sensitive photographic materials which can be used for 120 or 135 photographic films, which are widely employed as silver halide photographic films for general purpose cameras.

BACKGROUND OF THE INVENTION

Generally, cited as representative examples of silver halide light-sensitive photographic materials (photographic film) are sheet films such as X-ray film, film for graphic arts, cut film, and roll film. Listed as representative roll film are color film and black-and-white film having a width of 35 mm or less, which are placed in velvet lined cartridges which are loaded in general purpose cameras and employed for general picture taking. In addition, 120 film, having a greater width, may be listed.

Heretofore, cellulose triacetate film (TAC) has been used as the primary support for roll film. TAC film as the photographic support features excellent properties such as no optical anisotropy, high transparency, and residual curl diminishing properties, after photographic processing. Said TAC film is obtained by dissolving cellulose triacetate in organic solvents such as methylene chloride or the like, and casting the resultant solution onto a metal belt and the like, and subsequently drying the resultant film. Said organic solvents, especially chlorine based solvents such as methylene chloride and the like, which are used to dissolve cellulose triacetate, may cause environmental problems.

On the other hand, known as materials which make it possible to form film without employing solvents are polyesters such as polyethylene terephthalate (PET), polyethylene-2,6-naphthalate (PEN), and the like. Generally, a PET film is obtained by melt extruding PET and subsequently biaxially stretching the resultant film. Such PET film has been conventionally employed as a support for X-ray film as well as lithographic film. However, when said PET film is employed as a support for 120 and 135 films, namely is employed in a rolled set, roll set curl tends to occur. As a result, problems occur such as, for example, conveyance problems in the camera, generation of abrasion during the photographic processing as well as the printing process after said photographic processing, which is carried out to form images on a photographic paper, jamming during conveyance, and the like.

As a method to improve recovery properties from said roll set curl, Japanese Patent Publication Open to Public Inspection No. 1-244446 describes a copolymerized PET film provided with hydrophilicity, which is obtained by utilizing an aromatic dicarboxylic acid having a metal sulfonate group as a copolymerization component. Japanese Patent Publication Open to Public Inspection No. 4-93937 describes a technique which maintains recovery properties from roll set curl, as well as enhances the mechanical strength in which polyesters having different moisture contents are laminated.

Further, as techniques to enhance the adhesion between layers of the laminated film, produced by laminating copolyesters, Japanese Patent Publication Open to Public Inspection No. 6-23929 describes a technique in which copolymerization components in the layer which is employed for lamination are noted, Japanese Patent Publication Open to Public Inspection No. 6-289534 describes a technique in which differences in the amount of copolymerization components between laminated layers are noted, and Japanese Patent Publication Open to Public Inspection No. 6-161035 describes a technique in which in one layer, polyester employed in the other layer(s) is blended. Such techniques are preferable since they improve recovery properties from roll set curl, as well as improving mechanical strength and adhesion between layers of a laminated film.

Specifically, the technique described in said Japanese Patent Publication Open to Public Inspection No. 6-161035 is advantageous with the reduction of cost, because general purpose homopolyesters can be employed.

However, said technique is developed while primarily investigating a thin base having a layer thickness of about 80 μm. By contrast, the thickness of the TAC film employed in 120 and 135 films is about 120 μm. Though a decrease in film thickness is useful for decreasing the size of cameras and the like, the film thickness is preferably about 120 μm so that no focusing problem occurs when employed, instead of the commonly used TAC film.

It has been discovered that when the technique described in said patent is simply applied to an approximately 120 μm thick layer, the roll set curl tends to increase; recovery properties from the roll set curl is somewhat degraded compared to an 80 μm thick layer; conveyance in processors is degraded, and adhesion between layers is insufficient.

SUMMARY OF THE PRESENT INVENTION

In the foregoing, the present invention is accomplished. An object of the present invention is to provide a support for rolled light-sensitive photographic materials such as 120 and 135 films, which may be produced without using solvents, and to provide a production method thereof.

Namely, by adjusting film thickness from 105 to 130 μm, provided are rolled light-sensitive photographic materials which can be employed in cameras designed for commonly used 120 and 135 film, without resulting in focusing problems; results in almost no problem of roll set curl tendency even at a film thickness of 105 to 130 μm; exhibit excellent recovery properties from roll set curl as well as excellent adhesion between layers; and can be used in processors and the like without resulting in any problem.

The aforementioned object of the present invention is achieved employing the embodiments described below.

1. A support for a rolled light-sensitive photographic material comprised of at least three laminated layers, wherein primary component of outer layers is copolyester; at least one interlayer is a mixture layer composed of a mixture of copolyester and homopolyester; the total thickness of the laminated layers is 105 to 130 μm; the total thickness of interlayers is 45 to 85 μm; and the ratio of said copolyester in the layer composed of said copolyester and said homopolyester is 10 to 40 percent by weight.

2. The support for a rolled light-sensitive photographic material of item 1, wherein the copolyester of the primary component of the outer layers and copolyester of the mixture layer contain, as a component of copolymer, at least one aromatic dicarboxylic acid having a metal sulfonate group, and at least one of polyalkylene glycol and polyalkylene oxydicarboxylic acid.

3. The support for a rolled light-sensitive photographic material of item 2, wherein the copolyester comprises 4 to 10 mole percent of the aromatic dicarboxylic acid component having a metal sulfonate group with respect to the entire ester bonding units, and 2 to 8 percent by weight of at least one of polyalkylene glycol and polyalkylene oxydicarboxylic acid.

4. The support for a rolled light-sensitive photographic material of item 3, wherein the copolyester comprises 4.5 to 8 mole percent of the aromatic dicarboxylic acid component having a metal sulfonate group with respect to the entire ester bonding units, and 4 to 7 percent by weight of at least one of polyalkylene glycol and polyalkylene oxydicarboxylic acid.

5. The support for a rolled light-sensitive photographic material of item 1, wherein at least one of copolymerization component of the copolyester, copolymerization ratio and layer thickness is different from each other between the outer layers.

6. The support for a rolled light-sensitive photographic material of item 1, wherein the mixture layer comprises 10 to 40% by weight of the copolyester substantially same as the copolyester of the primary component of at least one of the outer layers.

7. The support for a rolled light-sensitive photographic material of item 1, wherein the mixture layer is adjacent to at least one of the outer layers and comprises 10 to 40% by weight of the copolyester substantially same as the copolyester of the primary component of at least one of the outer layers adjacent to the mixture layer.

8. The support for a rolled light-sensitive photographic material of item 1, wherein thickness of each of outer layers is 5 to 80 $\mu$m.

9. The support for a rolled light-sensitive photographic material of item 8, wherein thickness of each of outer layers is 15 to 60 $\mu$m.

10. The support for a rolled light-sensitive photographic material of item 6, wherein thickness of each of outer layers is 5 to 80 $\mu$m.

11. The support for a rolled light-sensitive photographic material of item 10, wherein thickness of each of outer layers is 15 to 60 $\mu$m.

12. The support for a rolled light-sensitive photographic material of item 1, wherein thickness of the outer layers is different each other.

13. The support for a rolled light-sensitive photographic material of item 6, wherein thickness of the outer layers is different each other.

14. The support for a rolled light-sensitive photographic material of item 12, wherein $1/8<T1/T2<1$ is satisfied, in the formula, T1 is thickness of one of the outer layer having small thickness and T2 is thickness of the other outer layer.

15. The support for a rolled light-sensitive photographic material of item 14, wherein $1/5<T1/T2<2/3$ is satisfied, in the formula, T1 is thickness of one of the outer layer having small thickness and T2 is thickness of the other outer layer.

16. The support for a rolled light-sensitive photographic material of item 13, wherein $1/5<T1/T2<2/3$ is satisfied, in the formula, T1 is thickness of one of the outer layer having small thickness and T2 is thickness of the other outer layer.

17. The support for a rolled light-sensitive photographic material of item 16, wherein $1/5<T1/T2<2/3$ is satisfied, in the formula, T1 is thickness of one of the outer layer having small thickness and T2 is thickness of the other outer layer.

18. The support for a rolled light-sensitive photographic material of item 1, wherein the mixture layer comprises recovered polyester in an amount of 3 to 40 percent by weight.

19. The support for a rolled light-sensitive photographic material of item 1, wherein the mixture layer comprises recovered polyester from laminated two or more layers one of which is composed of copolyester and the other is composed of a mixture of copolyester and polyester other than the copolyester in an amount of 3 to 40 percent by weight.

20. The support for a rolled light-sensitive photographic material of item 1, wherein difference in melt viscosity between laminated layers is not more than 50 percent.

21. The support for a rolled light-sensitive photographic material of item 1, wherein the support has magnitude of roll set curl after thermal treatment of not more than 135 $m^{-1}$, a magnitude of curl in warm water of not more than 50 $m^{-1}$, a degree of recovered curl after warm water treatment of not more than 40 $m^{-1}$, a magnitude of curl in the width direction of 3 to 20 $cm^{-1}$, a Young's modulus of 350 to 480 $kg/mm^2$, a Young's modulus immediately after immersion in water of at least 250 $kg/mm^2$, a loop stiffness of 10 to 30 g by weight, and a thermal shrinkage in the longitudinal direction of –0.5 to 3.0 percent.

DETAILED DESCRIPTION OF THE INVENTION

The present invention will now be detailed.

A polyester support (hereinafter referred to simply as a support) is the laminated polyester support comprised of at least three layers of polyester film (hereinafter referred to as at least three layers).

When a polyester film is formed by laminating at least three layers, a laminated polyester film support has a configuration such that both outer layers are comprised of copolyester, and at least one interlayer (a mixture layer) is comprised of a mixture in which the copolyester, which is preferably employed in any one of said outer layers, and homopolyester.

By employing at least one mixture layer in the layer configuration of polyester film, it is possible to improve adhesion between laminated layers, while, by employing a homopolyester, it is possible to reduce cost compared to the case in which at least two types of copolyesters are procured and laminated. Herein, "the outer layer" of the support formed by laminating at least three layers means the outermost layer among layers formed by lamination as a support, and one outermost layer exists on both sides of the support. Both outer layers refer to said layers. Incidentally, a so-called sublayer, which is separately applied to a support, is not included. Both outer layers may be comprised of different copolyesters, but from the viewpoint of cost and adhesion between layers, both layers are preferably comprised of the same copolyester. Further, the interlayers, as described herein, refer to the layers between said outer layers, and at least one layer among them is a mixture layer comprised of the copolyester substantially same with the copolyester used in the outer layer and said homopolyester. It is more preferable that the copolyester used in at least one of the outer layers is used in the mixture layer. The configuration of said interlayers is not particularly limited, but from the viewpoint of adhesion between layers, as well as cost, configurations such as, for example, a single layer comprised of a mixture layer or a mixture layer/homopolyester layer/mixture layer are preferable.

The total layer thickness of the support of the present invention is 105 to 130 $\mu$m, and preferably 115 to 125 $\mu$m. Said thickness overcomes the focusing problem in cameras as well as the loading problem into film cartridges.

The thickness of the interlayer of the support, which is formed by laminating at least three layers, is between 45 and 85 μm. When the thickness is less than 45 μm, roll set curl tends to result, while when the thickness exceeds 85 μm, recovery properties from roll set curl are degraded. The layer comprised of copolyester tends to result in roll set curl, but the resultant roll set curl is cancelled through water absorption during photographic processing. Accordingly, when the thickness of the outer copolymerized ester layer increases, the recovery properties are improved. However, water is only sufficiently absorbed into a relatively shallow region from the surface during photographic processing. Therefore, when the thickness further increases, the roll set curl tends to further increase and contribution to improvement of recovery properties diminishes. Thinner polyester has resulted in no pronounced problem. However, it is estimated that when the thickness increases, roll set curl tends to result due to effects of this phenomenon and the recovery properties from the roll set curl is occasionally degraded. The depth of the portion which sufficiently absorbs water during photographic processing is estimated to be about 30 μm. However, since said depth depends on various factors, it is difficult to generalize it.

Further, it is estimated that an increase in tendency of roll set curl in accordance with an increase in the thickness may be due to an increase in stress generated by winding the film onto a roll compared to that of a thinner film. It is also estimated that the phenomena described above affect the fact that an increase in thickness tends to increase the tendency of the roll set curl, and to degrade the recovery properties. At any rate, by adjusting the total thickness of interlayer(s) from 45 to 85 μm as described in the present invention, it is possible to maintain the tendency of roll set curl as well as a decrease in the roll set curl so that no problem occurs, even when employing a support having a thickness of 105 to 130 μm.

Further, the ratio of copolyester in the mixture layer is between 10 and 40 percent by weight. Namely, the ratio of the copolymerized component is between 10 and 40 percent by weight. When cutting and perforation are carried out in a relatively thick support, generated stress becomes greater than that of a relatively thin support. Due to that, when said ratio is less than 10 percent by weight, adhesion between layers becomes insufficient, and occasionally results in delamination between laminated layers. Further, when said ratio exceeds 40 percent by weight, roll set curl tends to result, even though the interlayer thickness is maintained in the aforementioned region, and further tends to result in conveyance problems in processing machines and the like. Incidentally, delamination between layers during cutting and perforation is affected by the types and conditions of apparatuses, as well as the cutting methods. For example, clearance between the upper edge and the lower edge is preferably small. Further, the operating edge is preferably arranged to have some angle rather than being horizontal with respect to a film, and the angle of the edge end is preferably set to be less than 90 degrees. Furthermore, as described in Japanese Patent Publication Open to Public Inspection No. 7-84338 and others, it is useful to provide physical lack or damage along the edge portion of a film for improvement of cutting properties.

Further, the support of the present invention preferably has an asymmetrical lamination structure regarding both surfaces from the center point, which equally divides the thickness. Such a lamination structure results in effects to minimize the tendency of roll set curl as well as to minimize adverse effects due to roll set curl. When a polyester film is comprised of three layers, it is possible to allow the structure to be asymmetrical by varying at least one of the copolymerization components, the copolymerization ratio, or the thickness of both outer layers between both outer layers. From the viewpoint of cost as well as production facilities, it is easiest to vary the layer thickness while employing the same copolyester resin. Further, at the time, it is preferable that in three- or more layer lamination, the side comprising the less amount of the copolymerization component, or when the same copolyesters are used, the side having a less thickness, is positioned as the inside surface, when producing photographic roll film.

Polyesters employed in the present invention will now be described.

The polyesters employed in the present invention are preferable those which are comprised of one aromatic dibasic acid and one glycol as the composition components. Said dibasic acids include terephthalic acid, isophthalic acid, 2,6-naphthalenedicaroxylic acid, and the like, while glycols include ethylene glycol, propylene glycol, butanediol, neopentyl glycol, 1,4-cyclohexanedimethanol, diethylene glycol, p-xylylene glycol, and the like. Of these, the polyethylene terephthalate comprised of terephthalic acid and ethylene glycol, as the composition components are preferred.

The copolyester preferably employed in the present invention is one in which at least one aromatic dicarboxylic acid, having a metal sulfonate group, and at least one of polyalkylene glycol and/or polyalkylene oxydicarboxylic acid are employed as copolymerization components, while aromatic dibasic acid and glycol are employed as major composition components. Listed as said dibasic acids and said glycols are those described above. Of these, copolymerized polyethylene phthalate, in which terephthalic acid and ethylene glycol are employed, as the major composition components.

Employed as aromatic dicarboxylic acids, having a metal sulfonate group, are preferably 5-sodiumsulfoisophthalic acid, 2-sodiumsulfoisophthalic acid, 4-sodiumisophthalic acid, 4-sodiumsulfo-2,6-naphthalene dicarboxylic acid, or ester forming derivatives thereof, as well as compounds in which said sodium is replaced with any of other metals (for example, potassium, lithium, and the like). The copolymerization ratio of the aromatic dicarboxylic acid component having a metal sulfonate group is preferably between 4 and 10 mole percent with respect to the entire ester bonding units to obtain sufficient recovery properties from roll set curl, as well as the tendency of roll set curl which causes almost no problem.

To be preferably between 4 and 10 mole percent with respect to the entire ester bonding units, and to be more preferably between 4.5 and 8 mole percent.

Employed as polyalkylene glycols are preferably polyethylene glycol, polytetramethylene glycol, and the like. Of these, polyethylene glycol is more preferred. The molecular weight is not particularly limited. However, it is preferably between 300 and 20,000, is more preferably between 600 and 10,000, and is most preferably between 1,000 and 5,000. Further, employed as polyalkylene oxydicarboxylic acids may be polyethylene oxydicarboxylic acid, polytetramethylene oxydicarboxylic acid, and the like. Of these, polyethylene oxydicarboxylic acid is preferred. The molecular weight is not particularly limited, however, it is preferably between 300 and 20,000, is more preferably between 600 and 10,000, and is most preferably between 1,000 and 5,000. The copolymerization ratio of polyalkylene glycol and/or polyalkylene oxydicarboxylic acid is preferably between 2 and 8 percent by weight to obtain sufficient recovery properties from roll set curl, as well as the tendency of roll set curl which causes almost no problem.

To be preferably between 2 and 8 percent by weight, and to be more preferably between 4 and 7 percent by weight with respect to the copolyester reaction product.

"The primary component of the outer layer is copolyester", as described in the present invention, means that at least 90 percent by weight of the outer layer is comprised of copolyester. In the present invention, at least 95 percent by weight of the outer layer is comprised of said copolyester.

The copolyester employed in the present invention may be copolymerized with other components in a range amount which does not adversely affect the effects of the present invention.

"Copolyester is substantially the same", as described in the present invention means that each of the copolyester is comprised of the same copolymerization component and the difference in the content of said copolymerization component is within 5 percent. The difference in the content of said copolymerization component is obtained employing the formula described below:

$(A-B)/A\times100$=difference in the content of the copolymerization component between copolyesters wherein "A" as well as "B" is the content of the copolymerization component under the condition of $A\geqq B$.

Further, when two copolyesters comprise different copolymerization components in the range which does not affect the resultant performance, it is possible to regard both to be substantially the same".

Dibasic acids or derivatives thereof, which may be employed other than those described above, include terephthalic acid, isophthalic acid, and phthalic acid, and lower alkyl esters (derivatives such as anhydrides, lower alkyl esters, and the like, capable of forming esters) of sodiumisophthalic acid sulfonate (sodiumsulfoisophthalic acid); aromatic dicaroboxylic acids such as 2,7-naphthalenedicarboxylic acid, 1,5-naphthalenedicaroxylic acid, diphenylcaroboxylic acid, diphenyl ether dicarboxylic acid, and the like and lower alkyl esters (derivatives such as anhydrides, lower alkyl esters, and the like, capable of forming esters) thereof; alicyclic dicarboxylic acids such as cyclopropanedicarboxylic acid, cyclobutanedicarboxylic acid, hexahydroterephthalic acid, and the like and derivatives (derivatives such as anhydrides, lower alkyl esters, and the like, capable of forming esters) thereof; aliphatic dicarboxylic acids such as adipic acid, succinic acid, oxalic acid, azelaic acid, sebacic acid, dimeric acid, and the like and derivatives (derivatives such as anhydrides, lower alkyl esters, and the like, capable of forming esters) thereof. These may be employed in an amount of not more than 10 mole percent, with respect to the total dibasic acid.

Listed as dihydric alcohols which may be employed in the present invention, other than those described above, may be trimethylene glycol, triethylene glycol, tetramethylene glycol, hexamethylene glycol, bisphenol A, p,p'-dihydroxyphenylsulfone, 1,4-bis(β-hydroxyethoxyphenyl) propane, p-phenylenebis(dimethylolcyclohexane), and the like. These dihydric alcohols may be employed in an amount of not more than 10 mole percent.

The aforementioned polyesters may be either those in which the terminal hydroxyl group and/or the terminal carboxyl group is inactivated employing unifunctional compounds such as, for example, benzoic acid, benzoylbenzoic acid, benzyloxybenzoic acid, methoxypolyalkylene glycol, and the like, or those which are modified with a very small amount of trifunctional or tetrafunctional ester forming compounds such as, for example, glycerin and pentaerythritol in the range in which linear copolymers are substantially obtained.

Antioxidants are preferably incorporated into polyesters employed in the present invention. Specifically, incorporation of said antioxidants is markedly effective when said polyesters are comprised of compounds having a polyoxyalkylene group. Types of antioxidants, which are incorporated, are not particularly limited, and various types of antioxidants may be employed. Listed as those are, for example, hindered phenol based compounds, phosphite based compounds, and thioether based compounds. Of these, from the point of transparency, antioxidants comprised of hindered phenol based compounds are preferred.

The content of antioxidants is commonly between 0.01 and 2 percent by weight with respect to the polyester, and is preferably between 0.1 and 0.5 percent by weight. When the content of said antioxidants decreases, a phenomenon of so-called fog formation, in which the density of the unexposed area of a photographic material increase tends to result, while when the content increases, the haze of a film base increases, occasionally degrading transparency. Incidentally, these antioxidants may be employed individually or in combination.

For the purpose of minimizing the light piping phenomenon, dyes are preferably incorporated into the polyester employed in the present invention. The types of dyes, which are provided to achieve said purpose, are not particularly limited, but said dyes should exhibit excellent heat resistance from the viewpoint of production. Listed as desired dyes are anthraquinone based and perylene based dyes. Further, as for tints, the polyester is subjected to gray dying as seen in common photographic materials. Listed as such dyes are the Macrolex series manufactured by Bayer Co., the Sumiplast series manufactured by Sumitomo Kagaku Co. Ltd., the Diaresin series manufactured by Mitsubishi Kagaku Co., Ltd., and the like. These dyes may be employed individually or in combination of two or more types so as to obtain the desired tints. At that time, in order to minimize said light piping phenomenon as well as to obtain excellent photographic prints, dyes are preferably employed so that the spectral transmittance in the wavelength range of 400 to 700 nm is between 60 and 85 percent, and further, the difference between the maximum spectral transmittance and the minimum spectral transmittance in the wavelength range of 600 to 700 nm is within 10 percent.

Methods for adding colorants are not particularly limited. The required amount of colorants may be added during any stage from polyester polymerization to melt extrusion, while coloration may also be carried out. Further, preferably employed is a method in which so-called master pellets having high concentration of colorants are previously prepared, and melt extrusion is carried out through suitable dilution because the concentration is readily controlled. Said method is useful when, in order to incorporate recovered polyester, fine concentration adjustment is required. The concentration of dyes in said master pellets is preferably between 100 and 10,000 ppm.

Further, when the concentration of dyes in polyester is constant, the amount of dyes in a thick support is greater than in a thin support, and the transmittance of the thick support is degraded. When an increase in the amount of dyes is problematic, it is possible to adjust the concentration of dyes of the layer to a lower value other than in the layer adjacent to the surface layer on the emulsion-coated side.

If desired, it is possible to allow the polyester film of the present invention to be made more slippery. Methods to achieve the slippery polyester film are not particularly limited. Commonly employed methods include an external particle addition method in which inert inorganic particles are added to polyester, an internal particle depositing method in which catalysts which are added during synthesis of polyester are deposited, or a method in which surface active agents and the like are applied onto the film surface.

Of these, the internal particle depositing method, in which deposit particles can be controlled to a relatively fine point, is preferred so that it allows the polyester to be made slippery without degrading the transparency. Various types of catalysts known in the art may be employed, and specifically Ca as well as Mn is preferably employed so that high transparency is obtained. These catalysts may be employed individually or in combination of two types.

Further, since polyester films, which may be employed in the present invention, are comprised of a multilayer structure, said functions, such as the minimization of oxidation, the minimization of light piping, and allowing films to be made more slippery may be applied to all layers, and various types of additives other than those described above may also be added to all layers. However, at least the surface layer is preferably subjected to addition of said additives. It is also possible to improve the transparency of said film by decreasing the addition amount, or by decreasing it to zero in other layers.

Polymerization of the copolyester employed in the present invention may be carried out employing any of the several common methods known in the art. Namely, after dicarboxylic acid components and glycol components undergo transesterification, copolyester is obtained by allowing the resultant products to undergo polycondensation at high temperature and reduced pressure. After the transesterification, aromatic dicarboxylic acids having a metal sulfonate group and polyethylene glycol which are copolymerization components are added, and polycondensation is carried out.

The intrinsic viscosity of the polyester resins employed in the present invention is preferably between 0.35 and 0.70. When the intrinsic viscosity is less than the lower limit, desired brittleness may not be obtained, while when the intrinsic viscosity exceeds the upper limit, mechanical strength likely to become excessive.

Employed as methods for laminating polyester may be those known in the art. Those methods include a co-extrusion method employing a plurality of extruders and a feed block system of dies or a multimanifold system of dies, an extrusion lamination method in which other resins, which constitute a laminated layer body, are melt extruded from an extruder onto a single layer film, or laminated films which constitute a laminated body and are cool solidified on a cooled drum, a dry lamination method in which a single layer film or laminated films which constitute a laminated layer body are laminated via, if desired, anchor agents or adhesives, and the like. Of these, preferred is the co-extrusion method which requires fewer processes and results in excellent adhesion between adjacent layers.

At that time, the melt viscosity of each layer is preferably between 100 and 500 Pas, because consistent flatness may be obtained. Further, difference in the melt viscosity between respective layers in the die is commonly not more than 50 percent, and is preferably not more than 30 percent. If said difference exceeds 50 percent, it may be difficult to obtain the desired flatness as well as the sufficient adhesion between layers, which is required for photographic supports. Incidentally, it is difficult to measure the melt viscosity in the die of each layer. Therefore, the melt viscosity of each layer is individually measured employing the method described in JIS K7199-1001, and the like. Temperature, shearing rate, and the like are appropriately determined depending on the conditions of said dice. The temperature is commonly between 260 and 330° C. The melt viscosity varies depending on such measurement conditions. In any case, however, it is important that viscosity difference in the conditions assuming said die is not more than 50 percent. The viscosity difference between layers refers to the value in percent expressed by (a–b)/a, wherein "a" and "b" (a>b) each represent the viscosity of each layer. The melt viscosity of each layer varies depending on the ratio of copolymerization components, the ratio of recovered polyester, and the like, or alternatively it is also possible to intentionally vary them. Further, it is possible to adjust the value to the desired ones by suitably varying a degree of polymerization of employed resins.

Employed as methods to obtain unstretched sheets as well as methods to uniaxially stretch a polyester film in the longitudinal direction, may be conventional ones known in the art. For example, polyester employed as the raw material is molded into pellets, which are subjected to vacuum drying while employing forced hot air or heating. Drying temperature is preferably high, being in the range at which oxidation decomposition due to heat does not occur, commonly between 100 and 200° C., and is preferably between 140 and 180° C. Vacuum drying is preferably employed because it is possible to minimize oxidation by decreasing oxygen as well as moisture. Drying is carried out so as to obtain a moisture content of not more than 100 ppm, and preferably not more than 30 ppm. Thereafter, polyester is melt extruded, being extruded from a T-die into a sheet, which is brought into close contact with a cooling drum, employing an electrostatic application method and the like, and then cooled and solidified to obtain an unstretched sheet.

Subsequently, a method is employed in which the obtained unstretched sheet is heated in the range of the glass transition temperature (Tg) of the polyester to Tg plus 100° C., employing heating devices such as a plurality of rollers and/or infrared heaters, and the like, and the heated sheet is subjected to single or multiple stage longitudinal stretching. The stretching factor is in the range of 2.5 to 6, which should allow the sheet to be stretched laterally. Stretching temperatures are preferably set utilizing the highest Tg among those of polyesters employed in each layer as the standard.

In the present invention, it is preferable that the polyester film, which is obtained by uniaxially stretching it in the longitudinal direction, as described above, is laterally stretched in the temperature range of Tg to Tm (melting point) minus 20° C., in the stretching regions which are divided into at least two regions, while increasing the temperature, and the stretched film is then thermally fixed. Further, the ratio of the longitudinal stretching factor to the lateral stretching factor is optionally adjusted so as to obtain desired characteristics, while measuring the physical parameters of the biaxially stretched film. The divided region of the stretching temperature is comprised of at least two stages and preferably three stages. More stages may be employed, but problems occur in which facilities must become larger, and the like. Temperature in each region is set so that it is raised higher successively, and the difference in the temperature is preferably set in the range of 1 to 50° C.

Incidentally, non-contact stretching such as simultaneous biaxial stretching, and the like, may be preferably employed because problems such as abrasion and the like barely occur.

Subsequently, thermal fixing is carried out. However, prior to the thermal fixing, the biaxially stretched film is maintained in the temperature range between no higher than the final lateral stretching temperature and no lower than Tg minus 40° C., for 0.01 to 5 minutes.

The film, which has been biaxially stretched in the longitudinal direction as well as in the lateral direction, is preferably subjected to thermal fixing in the temperature range of the higher temperature than the final lateral stretching temperature, to Tm minus 20° C. in a region which is divided into at least two regions, while increasing the temperature. The thermal fixing time is commonly between 0.5 and 300 seconds.

The thermally fixed film is commonly cooled to Tg or less. The clipped portions at both edges of the film are then cut off and the resultant film is wound up. During said processes, the film is preferably subjected to relaxation treatment in an amount of 0.1 to 10 percent in the lateral direction, in the temperature range of no higher than the final thermal fixing temperature to no less than Tg. Further the film is preferably cooled gradually from the final thermal fixing temperature to Tg at a cooling rate of no higher than 100° C. per second. Cooling methods as well as methods to carry out the relaxation treatment are not particularly limited, and typical methods known in the art may be employed. However, from the point of improving the dimensional stability of the film, these treatments are preferably carried out so that in a plurality of temperature regions, specifically cooling is successively carried out. Incidentally, the cooling rate is the value which is calculated from $(T1-Tg)/t$, wherein T1 is the final thermal fixing temperature, and t is the time which is required to cool the film from T1 to Tg. The optimal thermal fixing conditions, cooling, and relaxation treatment conditions vary depending on polyesters which constitute the film. Therefore, physical properties of the obtained biaxially stretched film are measured and said conditions are suitably determined so that desired characteristics are obtained.

Further, during the production of said film, prior to and/or after stretching, applied may be functional layers such as an antistatic layer, a slippage enhancing layer, an adhesive layer, a barrier layer, and the like. At that time, if desired, also carried out may be various surface treatments such as a corona discharge treatment, chemical treatments, and the like. Further, for the purpose of enhancing strength, carried out may be various kinds of stretching such as multistage longitudinal stretching, repeated longitudinal stretching, repeated longitudinal lateral stretching, lateral-longitudinal stretching, and the like, which are known in the art.

Since the polyester film, obtained as described above, exhibits minimum thickness fluctuation, excellent flatness, and minimum quality fluctuation, maximum effects of the present invention can be exhibited.

The recovered polyester of the present invention will now be described. The recovered polyesters, as described in the present invention, refer to those which are obtained by recovering film waste which is generated as cut edge waste during the casting process of photographic polyester supports, commercially unviable rolls, and the like, and subsequently shredding them, or those which are obtained by recovering wastes of photographic materials which are prepared employing polyester supports and films which are no longer needed by owners, peeling layers from the supports, and subsequently shredding the resultant supports. Specifically, the preferable recovered polyester is that which is obtained by recovering laminated polyester film comprised of at least two layers in which at least one layer is comprised of copolyester and at least another layer is comprised of polyester in which polyester other than said copolyester was blended.

According to the investigation performed by the inventors of the present invention, it has been clarified that by incorporating the recovered polyester, obtained as described above, into a mixture layer comprised of at least copolyester and another polyester, the tendency of roll set curl is minimized compared to the case in which no recovered polyester is incorporated. Its mechanism is not well understood. Said recovered waste is, for example, shredded, blended with copolyester chips and other polyester chips, and melted. It is assumed that since the recovered waste is one which has once been subjected to stretching treatment, fine crystal nuclei remain in the resultant melt and due to the presence of such crystal nuclei, the resultant layer tends to be more readily crystallized than that comprising no waste obtained as described above, so that the tendency of roll set curl is minimized.

The content ratio of the recovered polyester is between 3 and 40 percent by weight. When the ratio is less than 3 percent by weight, no effect to decrease the roll set curl is obtained. When the ratio exceeds 40 percent by weight, problems with strength, transparency, and the like, result.

Physical properties of the support of the present invention will now be described. In order to minimize conveyance problems in cameras as well as in processors and generation of abrasion marks due to conveyance problems, the polyester support employed in the present invention preferably exhibits the physical properties described below.

The magnitude of roll set curl after a thermal treatment is generally not more than 135 $m^{-1}$, and is preferably not more than 130 $m^{-1}$. When a support exhibits a magnitude of curl larger than the value described above, conveyance problems in cameras and photographic processors, as well as abrasion problems due to poor conveyance tend to occur.

The magnitude of curl in warm water is generally not more than 50 $m^{-1}$, and is preferably 45 $m^{-1}$. When the magnitude of curl in warm water is greater than said value, problems may occur during processing employing a hunger type automatic processor.

The degree of recovered curl after warm water treatment is generally 40 $m^{-1}$. If said curl is below this value, processed films will results in no problem during the printing operation onto photographic paper.

The magnitude of curl in the width direction is generally between 3 and 20 $m^{-1}$. When said magnitude of curl is not more than the lower limit or no less than the upper limit, curl in the width direction after coating of a hydrophilic colloid layer increases, and problems may result in the formation of abrasion during conveyance in cameras, and the like.

Young's modulus is generally between 350 and 480 $kg/mm^2$. Further, loop stiffness is generally between 10 and 30 g by weight. Beyond these ranges, problems may occur during automatic loading of a film into a camera and during automatic winding, as well as conveyance problems during photographic processing and printing operation onto photographic papers.

Young's modulus immediately after immersion in water is generally no less than 250 $kg/mm^2$. When said Young's modulus is less than said value, problems may result in which a film is broken during photographic processing.

The thermal shrinkage percent in the longitudinal direction is generally between 0.5 and 3.0 percent. When it exceeds 3.0 percent, coating problems may occur during coating of an adhesive layer and an electrically conductive layer, and further flatness may be degraded.

Generally, it has been difficult to realize all these physical properties employing films for the support comprised of polyester. However, it is possible to realize all these physical properties employing the laminated polyester film of the present invention and to simultaneously solve the aforementioned problems.

Incidentally, values described above are measured employing the methods described below. Further, the thickness of a hydrophilic colloid layer applied onto the support of the present invention is optimally 25 μm or less. When the thickness exceeds said value, the preferred ranges of said physical parameters may vary.

Magnitude of Roll Set Curl After Thermal Treatment

A support is cut into 35 mm (lateral direction during production)×120 mm (longitudinal direction during production) strips and is set aside over one day at conditions of a temperature of 23° C. and a relative humidity of 55 percent. Thereafter, it is wound on a 10.8 mm diameter core. At that time, when the support results in curl in the width direction, the concave surface of said support is wound facing up. Thereafter, thermal treatment is carried out for 4 hours at conditions of 55° C. and 20 percent relative humidity. After the thermal treatment, the wound support is allowed to cool for 30 minutes at conditions of 23° C. and 50 percent relative humidity. Thereafter, the cooled support is released from the core. After an elapse of one minute, the magnitude of roll set curl of the support is measured. Magnitude of curl is expressed by 1/r, wherein r represents the radius in mm of curvature of the curled support.

Magnitude of Curl in Warm Water

A support is cut into 35 mm (lateral direction during production)×2 mm (longitudinal direction during production) strips and is immersed in 30° C. warm water for 30 minutes. Then the magnitude of curl in the width direction under water is measured. When the side, onto which an emulsion layer is applied, is concave, the measured value is designated as a positive value.

Degree of Recovered curl after Warm Water Treatment

A support is subjected to thermal treatment in the same manner as for the magnitude of roll set curl after thermal treatment. After the thermal treatment, the support is released from the core and a load of 70 g is applied to the end of the support which is immersed in 38° C. water for 10 minutes. Thereafter, 55° C. drying is carried out for 3 minutes employing a warm air dryer, while the load is being applied. The load is then removed and the support is stored laterally for one day at conditions of 23≦ C. and 55 percent relative humidity. Thereafter, the magnitude of curl at the central area of the film is measured.

Magnitude of Curl Across the Width

A support is cut into a 35 mm (lateral direction during production)×2 mm (longitudinal direction during production) strips and is set aside for one day at conditions of 23° C. and 55 percent relative humidity. Thereafter, the magnitude of curl across the width is measured. When the side, onto which an emulsion layer is applied, is concave, the measured value is designated as a positive value.

Young's Modulus and Young's Modulus Immediately after Immersion in Water

A support is set aside in a room conditioned at 23° C. and 55 percent relative humidity for at least 4 hours, and is then cut into samples having a width of 10 mm and a length of 150 mm. The obtained sample is subjected to a tension test at a tension rate of 100 m/minute at a chuck width of 100 mm. Young's modulus is calculated from the tangent at the rising portion of the obtained load-elongation curve. On the other hand, Young's modulus immediately after immersion in water is measured in the same manner immediately after immersing the support in 25° C. water for 30 minutes.

Loop stiffness

A support is cut into 35×180 mm strips and a loop is formed employing a 100 mm long portion near the center of the film strip, and the load which is required to push the resulting loop into 10 mm from the outside is measured. Said measurement is carried out employing a "Loop Stiffness Tester" (manufactured by Toyo Seiki Seisakusho, Ltd.).

Thermal Shrinkage Percent

A support is cut into a 150×180 mm sample and is rehumidified at conditions of 23° C. and 55 percent relative humidity for one day. Thereafter, ruled lines having an interval of 100 mm in the longitudinal direction, as well as in the lateral direction, are drawn. The resultant sample is subjected to thermal treatment at 130° C. for 30 minutes and is further rehumidified at conditions of 23° C. and 55 percent relative humidity for one day. Thereafter, the distance between said ruled lines is again measured. The difference in distances between the ruled lines before and after the thermal treatment is noted and the difference is converted to percent with respect to the distance before the thermal treatment. The shrinking direction and expanding direction with respect to the distance before the thermal treatment is designated as + and −, respectively.

Further, impurities such as oligomers, aldehydes, diethylene glycol (DEG), which are incorporated into the support of the present invention, are preferably negligible, because they tend to adversely affect photographic performance such as fogging and the like. For example, the content of oligomers is commonly not more than 3 percent, and is preferably not more than 1 percent. The content of DEG is commonly not more than 5 mole percent, and is preferably not more than 1 mole percent. The content of aldehydes is commonly not more than 100 ppm, and is preferably not more than 30 ppm.

The support of the present invention is employed to constitute a silver halide light-sensitive photographic material by having at least one silver halide emulsion layer on at least one side. Said silver halide emulsion layer may be directly applied onto the support or may be applied via another layer such as, for example, a hydrophilic colloid layer comprising no silver halide emulsion.

At the time, in order to enhance adhesion, if desired, photographic supports may be subjected to various types of surface treatments such as a corona discharge treatment, a glow discharge treatment, an ultraviolet ray treatment, a flame treatment, an atmospheric pressure in-gas plasma treatment, a chemical composition treatment, and the like.

Further, besides a silver halide emulsion layer and a sublayer, it is possible to provide an electrically conductive layer, a back coat layer, a slipping layer, a transparent magnetic layer, a protective layer, and the like. Specifically, the electrically conductive layer and the slipping layer are preferably employed to minimize static marks and abrasion marks, respectively. Employed as electrically conductive agents may be, for example, bridge type copolymer particles having a quaternary ammonium group at the side chain described in Japanese Patent Publication No. 60-51693, Japanese Patent Publication Open to Public Inspection Nos. 61-223736 and 62-9346; cation antistatic agents such as ionen polymer bridge type or having an ionen polymer at the side chain described in Japanese Patent Publication Open to Public Inspection No. 7-28194; those comprised of alumina sol as the main component described in Japanese Patent Publication No. 35-6616; fine particles of metal oxides such as ZnO, $SnO_2$, $TiO_2$, $Al_2O_3$, $In_2O_3$, $SiO_2$, MgO, BaO, $MoO_3$, $ZiO_2$, and the like, described in Japanese Patent Publication Open to Public Inspection No. 57-104931; metal oxides such as $V_2O_5$ and the like; and the like. Employed as slipping agents may be, for example, those described in Japanese Patent Publication Open to Public Inspection No. 2000-19682.

Employed as silver halides, which constitute the silver halide emulsion layer employed in the present invention, may be those having an optional composition, which include, for example, silver chloride, silver chlorobromide, silver chlorobromoiodide, pure silver bromide, and pure silver iodide.

Silver halide emulsions may be prepared employing methods described, for example, in "1. Emulsion preparation and types" in Research Disclosure (hereinafter referred to as RD) No. 17643, pages 22 to 23, (December 1979), and RD No. 18716, page 648; P. Glakides, "Chimie et Physique Photographique, Paul Montel, 1967; G. F. Dauffin, "Photographic Emulsion Chemistry", Focal Press, 1966; V. L. Zelikman et al., "Making and Coating Photographic Emulsion", Focal Press, 1964; and others.

Preferred as emulsions are monodispersed emulsions described in U.S. Pat. Nos. 3,574,628 and 3,665,394, British Patent No. 1,413,748, and others.

Silver halide emulsions may undergo physical ripening, chemical ripening and spectral sensitization. Additives, which are employed in such processes, are described in RD No. 17643, RD No. 18716, and RD No. 308119 (hereinafter referred to as RD 17643, RD 18716, and RD 308119, respectively). Pages, on which each additive is described, are shown below.

| (Item) | (RD 308119) | (RD 17643) | (RD 18716) |
|---|---|---|---|
| Chemical sensitizer | page 996 III-A | page 23 | page 648 |
| Spectral sensitizer | page 996 IV-A, B, C, D | pages 23 to 24 | pages 648 to 649 |
| Supersensitizer | page 996 IV-A to B, J Item | pages 23 to 24 | pages 648 to 649 |
| Antifoggant | page 998 VI | pages 23 to 25 | page 649 |
| Stabilizer | page 998 VI | pages 24 to 25 | page 649 |

When the light-sensitive photographic material of the present invention is a light-sensitive color photographic material, usable photographic additives are described in the aforementioned RDs.

| (Item) | (RD 308119) | (RD 17643) | (RD 18716) |
|---|---|---|---|
| Antistain agent | page 1002 Item VII-I | page 25 | page 650 |
| Image dye stabilizer | page 1001 Item VII-J | page 25 | |
| Brightening agent | page 998 V | page 24 | |
| Ultraviolet absorber | page 1003 VIII-C | pages 25 to 26 | Item XIII-C |
| Light absorbing agent | page 1003 VIII | pages 25 to 26 | |
| Light scattering agent | page 1003 VIII | | |
| Filter dye | page 1003 VIII | pages 25 to 26 | |

-continued

| (Item) | (RD 308119) | (RD 17643) | (RD 18716) |
|---|---|---|---|
| Binder | page 1003 IX | page 26 | page 651 |
| Antistatic agent | page 1006 XIII | page 27 | page 650 |
| Hardener | page 1004 X | page 26 | page 651 |
| Plasticizer | page 1006 XII | page 27 | page 650 |
| Lubricant | page 1006 XII | page 27 | page 650 |
| Surfactant-coating aid | page 1005 XI | pages 26 to 27 | page 650 |
| Matting agent | page 1007 XVI | | |
| Developing agent (incorporated in light-sensitive materials) | page 1011 Item XX-B | | |

Further, when the light-sensitive photographic materials of the present invention is light-sensitive color photographic materials, various types of couplers can be employed, and specific examples of those are described in RD 17643 as well as in RD 308119 described below. Pages related to those are described below.

| (Item) | (RD 308119) | (RD 17643) |
|---|---|---|
| Yellow coupler | page 1001 Item VII-D | page 25 Item VII-C to G |
| Magenta coupler | page 1001 Item VII-D | page 25 Item VII-C to G |
| Cyan coupler | page 1001 Item VII-D | page 25 item VII-C to G |
| Colored coupler | page 1002 Item VII-G | page 25 Item VII-G |
| DIR coupler | page 1001 Item VII-F | page 25 Item VII-F |
| BAR coupler | page 1002 Item VII-F | |
| Other useful residual group Split-off coupler | page 1001 Item VII-F | |
| Alkali-soluble coupler | page 1001 Item VII-E | |

Further, these additives are incorporated into a light-sensitive photographic layer, employing the dispersion method described in RD 308119 page 1007 Item XIV, and the like. In light-sensitive color photographic materials, it is possible to provide auxiliary layers such as a filter layer, an interlayer, and the like, which are described in said RD 308119 Item VII-K. When a light-sensitive color photographic material is constituted, various layer configuration such as a conventional layer order, an unconventional layer order, a unit configuration, and the like may be utilized.

The silver halide light-sensitive photographic material of the present invention may be developed by developing agents known in the art, which are described, for example, in T. H. James, "The Theory of the Photographic Process", Forth Edition, pages 291 to 334 and Journal of the American Chemical Society Vol. 73, No. 3, page 100 (1951). Further, color light-sensitive photographic materials may be subjected to photographic processing employing conventional methods described in RD 17643 pages 28 to 29, RD 18716 page 615, and RD 308119 XIX.

EXAMPLES

The present invention is further specifically described with reference to examples. The term "parts" in the following description is "parts by weight", unless otherwise specified.

Example 1

(Preparation of Biaxially Stretched Laminated Polyester Support)

Added to 100 parts by weight of dimethyl terephthalate and 64 parts by weight of ethylene glycol was 0.1 part by weight of hydrated calcium acetate, and the resultant mixture underwent transesterification, employing a conventional method. Added to the obtained products were 29 parts by weight (equivalent to 5.2 mole percent/total acid component) of a 5-sodiumsulfo-di(β-hydroxyethyl) isophthalic acid ethylene glycol solution (having a concentration of 35 percent by weight), 9.8 parts by weight (equivalent to 7.8 percent by weight/polymer) of polyethylene glycol (having an number average molecular weight of 3,000), 0.05 part by weight of antimony trioxide, and 0.13 part by weight of trimethyl phosphate. The resultant mixture was gradually heated under the reduction of pressure, and underwent polymerization at 280° C. and 0.5 mmHg, whereby copolyester was obtained. The resultant polyester was mix kneaded with a dye manufactured by Bayer Co. in the following mixing ratio, and master pellets having a dye concentration of 2,000 ppm were prepared. Subsequently, said copolyester and the resultant mater pellets were blended in a ratio of 9 to 1, and Polyester A was obtained.

Macrolex Red EG 1

Macrolex Violet B 1

Macrolex Green G 1

On the other hand, master pellets were prepared in the same manner as above, employing commercially available polyethylene terephthalate (PET, having an intrinsic viscosity of 0.65), and polyethylene terephthalate and the resultant master pellets were blended in a ratio of 9 to 1. The resultant polyester and the obtained polyester were blended employing a Tumbler blender so that the ratio of copolyester/PET was 25/75 in terms of the weight ratio, whereby Polyester B was obtained.

Obtained Polyester A as well as Polyester B was subjected to vacuum drying at 150° C. for 8 hours, and subsequently was melt extruded at 280° C., employing three extruders. The extruded polyesters were brought into contact with each other within a T die so as to form a laminated film structure; were brought into close contact with the surface of a cooling drum, while being subjected to electrostatic application; and were cool solidified to prepare the unstretched laminated sheet comprised of three layers. At that time, each extruder was regulated so that Polyester A was placed as both outer layers and Polyester B was placed as an interlayer, and the ratio of each layer thickness was 1:2:1. The resultant unstretched sheet was stretched 3.5 times in the longitudinal direction at 90° C., employing a roll type longitudinal stretching device.

The obtained uniaxially stretched film was stretched at 100° C. in the total lateral stretching ratio of 50 percent in a first stretching zone, and further was stretched at 120° C. in a second stretching zone so as to obtain the total lateral stretching by a factor of 3.6, while employing a tenter type lateral stretching device. Subsequently, the resultant film was thermally treated at 100° C. for 2 seconds, was further thermally fixed at 170° C. for 5 seconds in a first thermal fixing zone, and subsequently was thermally fixed at 210° C. for 15 seconds in a second thermal fixing zone. Thereafter, while carrying out 5 percent relaxation treatment in the lateral direction, the resultant film was gradually cooled to room temperature over 30 seconds, whereby a biaxially stretched laminated polyester support having a thickness of 120 μm (each layer having a thickness of 30, 60, and 30 μm) was obtained.

(Preparation of Rolled Silver Halide Light-sensitive Photographic Materials)

The obtained laminated polyester support was subjected to in-gas discharge plasma treatment of 50 W·minute/$m^2$ at a pressure of 760 Torr, while introducing a gas mixture comprised of argon/hydrogen/nitrogen in a ratio of 96/2/2 (in percent of partial pressure) in line with Japanese Patent Publication Open to Public Inspection Nos. 11-5857, 2000-63547 and 2000-72903.

Subsequently, sublayer lower layer coating composition u-1 was applied onto one surface so as to obtain a dried layer thickness of 0.1 μm. The antistatic layer coating composition as-2 described below was applied onto the other surface so as to obtain a dried layer thickness of 0.3 μm, and subsequently dried. Then the protective layer lower layer coating composition b-1 described below was applied onto as-2 so as to obtain a dried layer thickness of 0.8 μm, and subsequently dried. Thereafter, the slipping layer coating composition o-1 described below was applied onto b-1 so as to obtain a dried layer thickness of 0.02 μm, and subsequently dried. Then, the resultant film was thermally treated at 120° C. for 2 minutes and was wound.

Subsequently, the layer configuration, which was the same as silver halide emulsion layer configuration of a commercially available color negative film "Konica Color JX-400", manufactured by Konica Corp., was applied onto u-1, and thus a silver halide light-sensitive photographic material was obtained.

The obtained silver halide light-sensitive photographic material was cut into the dimensions specified by JIS K 7519-1982 "135 Film·Cartridge", and placed into a cartridge. Thus a rolled silver halide light-sensitive photographic material was obtained. The resultant material was designated as Sample 1.

| | |
|---|---|
| **<Sublayer Lower Layer Coating Composition u-1>** | |
| Gelatin | 10 g |
| Compound (UL-1) | 0.2 g |
| Crosslinking agent (UL-2) | 0.2 g |
| Silica particles (having an average particle diameter of 3 μm) | 0.1 g |
| Water to make | 1 liter |
| **<Antistatic layer Coating Composition as-2>** | |
| Gelatin | 10 g |
| Fine antimony doped tin oxide fine particles SN100D (having a solid portion of 30 percent, manufactured by Ishihara Sangyo) | 150 g |
| Compound (UL-1) | 0.4 g |
| Crosslinking agent (UL-2) | 7.5 g |
| Water to make | 1 liter |
| **<Protective Layer Lower Layer Coating Composition b-1>** | |
| Cellulose diacetate (having a degree of acetylation of 55 percent, and weight average molecular weight of 180,000) | 100 weight parts |
| Tolylene diisocyanate | 17.0 weight parts |
| Crosslinking PMMA particles (MX-150, Soken Kagaku) | 0.2 weight part |
| Acetone | 1130 weight parts |
| Cyclohexane | 280 weight parts |
| **<Slipping Layer Coating Composition o-1>** | |
| Carnauba wax | 7 g |
| Toluene | 700 g |
| Methyl ethyl ketone | 300 g |

UL-1

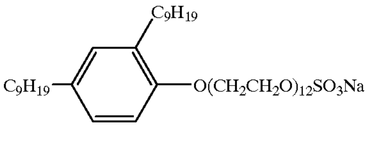

-continued

UL-2

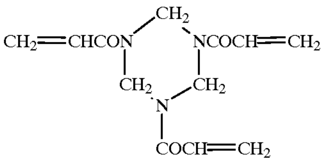

(Evaluation)

The magnitude of roll set curl as well as the magnitude of recovered curl after warm water treatment of the obtained Sample 1 was measured employing the aforementioned methods, and was evaluated based on the criteria described below. Further, adhesion properties between layers of the support as well as processing aptitude of rolled silver halide light-sensitive photographic materials were evaluated employing the methods described below. Table 1 shows the results.

Magnitude of roll set curl

AA: 120>magnitude of curl

A: 120≦magnitude of curl≦125

B: 125<magnitude of curl≦130

C: 130<magnitude of curl≦135

D: 135<magnitude of curl≦140

E: 140<magnitude of curl

For practical use, C or less magnitude of curl is preferred.

Degree of Recovered Curl after Warm Water Treatment

AA: 25>magnitude of curl

A: 25≦magnitude of curl≦30

B: 30<magnitude of curl≦35

C: 35<magnitude of curl≦40

D: 40<magnitude of curl≦50

E: 50<magnitude of curl

For practical use, C or less magnitude of curl is preferred.

Adhesion Properties

A support having a sample size of 35 mm×1.2 m was perforated at an ambience of 23° C. and 25 percent relative humidity, employing a perforator (manufacture by Mitsutoyo Seisakusho, Ltd.) in accordance with JIS K 7519-1982. The perforated cross-section was observed employing an optical microscope and the state of delamination between polyester layers was evaluated based on the criteria described below. For practical use, C or better grade is preferred.

A: no delamination between polyester layers was observed

B: no delamination was observed, but fins were occasionally observed in the cross section C: no delamination was visually observed, but was observed employing a microscope D: delamination was visually observed.

Processing Aptitude

By employing the obtained photographic film, photographic processing as well as printing operation was carried out (NPS-808 manufactured by Konica Corp. was employed), and generation of jamming (clogging) as well as formation of abrasion marks of the film was observed. For practical use, C or better grade is preferred.

A: neither jamming nor abrasion resulted

B: no jamming resulted, but less than three very weak linear abrasion marks which did not affect prints resulted C: no jamming resulted, but 3 to 10 very weak linear abrasion marks resulted D: no jamming resulted, but readily noticeable abrasion marks resulted E: jamming resulted.

Sample 2

Sample 2 was prepared in the same manner as Sample 1, except that the thickness of each layer was varied to 20 μm/80 μm/20 μm. Table 1 shows the results.

Sample 3 and 4 (Comparative Examples)

Sample 3 and 4 were prepared in the same manner as Sample 1, except that each layer in Sample 3 was varied to 40 μm/40 μm/40 μm and in Sample 4 was varied to 15 μm/90 μm/15 μm. Table 1 shows the results. The interlayer thickness of these samples is out of the range of the present invention.

Sample 5

Sample 5 was prepared in the same manner as Sample 1, except that copolyester was prepared so that the concentration of 5-sodiumsulfo-di(β-hydroxyethyl)isophthalic acid was 7 mole percent with respect to the entire ester bonding units and the concentration of polyethylene glycol was 5 percent by weight with respect to the reaction products; the weight ratio of copolyester/PET in the interlayer was 35/65, and each layer thickness was varied to 15 μm/65 μm/40 μm. Table 1 shows the results.

Sample 6

Sample 6 was prepared so as to have a 5-layer configuration of copolyester 15 μm/mixture layer 10 μm/homo PET 45 μm/mixture layer 10 μm/copolyester 40 μm (copolymerization components and ratio of the copolyester and the mixing ratio in the mixture layer were the same as Example 3). Table 1 shows the results.

Sample 7

Sample 7 was prepared in the same manner as Sample 5, except that the weight ratio of copolyester/PET in the interlayer was varied to 10/90. Table 1 shows the results.

Sample 8 (Comparative Example)

Sample 8 was prepared in the same manner as Sample 5, except that the weight ratio of copolyester/PET in the interlayer was varied to 45/55. Table 1 shows the results. In Sample 8, the mixing ratio of the mixture layer was out of the range of the present invention.

Sample 9

A preliminary sample was prepared in the same manner as Sample 5, except that recovered polyester, which was obtained by shredding the support of Sample 5, was added to the interlayer in an amount of 20 percent by weight. Then Sample 9 was prepared in the same manner as Sample 5, except that recovered polyester, which was obtained by shredding the support of said preliminary sample, was added to the interlayer in an amount of 20 percent by weight. Table 1 shows the results.

Sample 10

Sample 10 was prepared in such a manner that copolyester was prepared so that the concentration of 5-sodiumsulfo-di(β-hydroxyethyl)isophthalic acid was 8 mole percent with respect to the entire ester bonding units and the concentration of polyethylene glycol was 4 percent by weight with respect to the reaction products; the weight ratio of copolyester/PET in the interlayer was 20/80; each layer thickness was 10 μm/60 μm/40 μm; and recovered polyester obtained by shredding the support of Sample 5 was added to each of both outer layers in an amount of 5 percent by weight, and to the interlayer in an amount of 15 percent by weight. Table 1 shows the results.

Samples 11 and 12

Samples 11 and 12 were prepared in the same manner as Sample 10, except that polyethylene glycol as the copolymerization component was replaced with polyethylene oxycarboxylic acid (having a number average molecular weight of 4,000). Table 1 shows the results.

Sample 13, 14, and 15

Samples 13, 14, and 15 were prepared in the same manner as Sample 5, except that the copolymerization ratio (SIP and PEG) was varied to values described in Table 1. Table 1 shows the results.

Further, Sample 8 resulted no problem with the adhesion between layers, but resulted in some degradation of the magnitude of recovered curl after the warm water treatment and was on a problematic level with the processing aptitude.

Furthermore, Sample 9 resulted in the less magnitude of roll set curl as well as the less magnitude of recovered curl after the warm water treatment than Sample 5, and resulted in the excellent processing aptitude as well as the excellent adhesion between layers.

Samples 11 and 12 showed the same results as the case in which polyethylene glycol was used.

TABLE 1

| Sample | SIP (in mole %) | PEG or PEG Acid (in weight %) | Layer Thickness (in μm) | Mixture Ratio in Mixture Layer | Recovered Polyester | Roll Set Curl after Theremal Treatment | After Warm Water Treatment | Processing Aptitude | Adhesion | Remarks |
|---|---|---|---|---|---|---|---|---|---|---|
| 1 | 5.2 | 7.8 | 30/60/30 | 25/75 | 0/0/0 | B | B | A | A | Present Invention |
| 2 | 5.2 | 7.8 | 20/80/20 | 25/75 | 0/0/0 | B | B | A | A | Present Invention |
| 3 | 5.2 | 7.8 | 40/40/40 | 25/75 | 0/0/0 | D | D | B | D | Comparative Example |
| 4 | 5.2 | 7.8 | 15/90/15 | 25/75 | 0/0/0 | B | D | A | D | Comparative Example |
| 5 | 7 | 5 | 15/65/40 | 35/65 | 0/0/0 | A | A | A | AA | Present Invention |
| 6 | 7 | 5 | 15/10/45/10/40 | 35/65 | 0/0/0 | A | A | A | AA | Present Invention |
| 7 | 7 | 5 | 15/65/40 | 10/90 | 0/0/0 | A | A | C | AA | Present Invention |
| 8 | 7 | 5 | 15/65/40 | 45/55 | 0/0/0 | D | D | A | D | Comparative Example |
| 9 | 7 | 5 | 15/65/40 | 35/65 | 0/20/0 | AA | AA | A | AA | Present Invention |
| 10 | 8 | 4 | 10/60/40 | 20/80 | 5/15/5 | AA | AA | A | AA | Present Invention |
| 11 | 5.2 | 7.8 | 30/60/30 | 25/75 | 0/0/0 | B | B | A | A | Present Invention |
| 12 | 7 | 5 | 15/65/40 | 35/65 | 0/20/0 | AA | AA | A | AA | Present Invention |
| 13 | 3 | 10 | 15/65/40 | 35/65 | 0/0/0 | C | C | A | C | Present Invention |
| 14 | 5 | 1 | 15/65/40 | 35/65 | 0/0/0 | C | C | A | C | Present Invention |
| 15 | 12 | 5 | 15/65/40 | 35/65 | 0/0/0 | C | C | C | C | Present Invention |
| 16 | 7 | 5 | 50/70 | 30/70 | 0/50 | D | D | A | D | Comparative Example |

SIP: 5-sodium-di(β-hydroxyethyl)isophthalic acid

PEG: polyethylene glycol

PEG Acid: polyethylene oxycarboxylic acid

As can clearly be seen from Table 1, the rolled light-sensitive photographic materials (rolled silver halide light-sensitive photographic materials in examples) of the present invention resulted in almost no problems with the magnitude of roll set curl after the thermal treatment and the magnitude of recovered curl after the warm water treatment, as well as with the practical processing aptitude and the adhesion between layers.

By contrast, Sample 3 was on a problematic level with the magnitude of curl after the thermal treatment, and Sample 4 resulted in some degradation of the magnitude of the recovered curl and was on a problematic level with the processing aptitude.

Further, Sample 7 was on an excellent level with a magnitude of curl after the thermal treatment as well as with the magnitude of recovered curl after the warm water treatment, and was in the no problematic lower limit of the adhesion between layers.

Samples 13, 14, and 15 were in no problematic lower limit of a magnitude of roll set curl after the thermal treatment, a degree of recovered curl after the warm water treatment, and the processing aptitude, and was on a no problematic level with the adhesion between layers.

(Measurement of Melt Viscosity)

The melt viscosity of polyesters A and B of Sample 9 was measured under conditions of a temperature of 280° C. and a shear rate of 500 $sec^{-1}$, employing a method in accordance with JIS K 7209-1991. The melt viscosity of polyester A was 210 Pas, while that of polyester B was 190 Pas. The melt viscosity of the copolyester was 230 Pas, while that of the mixture layer was 180 Pas. It is possible to cast these samples without any problem and the resultant performance causes no problem as described above.

(Other Physical Property Values of Supports)

Each physical property value of supports, which is measured employing methods described above, will be shown.

Sample 9

Magnitude of curl in warm water: 42

Magnitude of curl across the width: 13

Young's modulus: 380 $kg/mm^2$

Young's modulus after immersion in water: 310 $kg/mm^2$

Loop Stiffness: 18 g by weight

Thermal shrinking coefficient: 2.3 percent

It is found that values shown above are within the desired range of those of physical properties of the present invention and as described above, the performance results in no problem.

According to the present invention, it is possible to produce a support for rolled light-sensitive photographic materials such as 120 type and 135 type without using solvents. In addition, by adjusting the thickness of said support from 105 to 130 μm, it is possible to employ rolled light-sensitive photographic materials, employing said support, in cameras designed for commonly used 135 and 120 films without resulting in focusing problems. Further even in the range of the thickness of said support between 105 and 130 μm, the tendency of roll set curl is on a level which results in no problem. The recovery properties from roll set curl as well as the adhesion between layer are excellent so that is possible to use rolled light-sensitive photographic materials, employing said support, in processors and the like without resulting in any problem.

What is claimed is:

1. A support for a rolled light-sensitive photographic material comprised of first outer layer, second outer layer and at least one interlayer laminated between said first outer layer and said second outer layer, wherein primary component of the first and the second outer layers is copolyester; at least one interlayer is a mixture layer composed of a mixture of copolyester and homopolyester; the total thickness of the laminated layers is 105 to 130 μm, the total interlayer thickness is 45 to 85 μm; and the ratio of said copolyester in the layer composed of said copolyester and said homopolyester is 10 to 40 percent by weight.

2. The support for a rolled light-sensitive photographic material of claim 1, wherein the copolyester of the primary component of the outer layers and copolyester of the mixture layer contain, as a component of copolymer, at least one aromatic dicarboxylic acid having a metal sulfonate group, and at least one of polyalkylene glycol and polyalkylene oxydicarboxylic acid.

3. The support for a rolled light-sensitive photographic material of claim 2, wherein the copolyester comprises 4 to 10 mole percent of the aromatic dicarboxylic acid component having a metal sulfonate group with respect to the entire ester bonding units, and 2 to 8 percent by weight of at least one of polyalkylene glycol and polyalkylene oxydicarboxylic acid.

4. The support for a rolled light-sensitive photographic material of claim 3, wherein the copolyester comprises 4.5 to 8 mole percent of the aromatic dicarboxylic acid component having a metal sulfonate group with respect to the entire ester bonding units, and 4 to 7 percent by weight of at least one of polyalkylene glycol and polyalkylene oxydicarboxylic acid.

5. The support for a rolled light-sensitive photographic material of claim 1, wherein the first outer layer is different from the second outer layer with respect to at least one of copolymerization component of the copolyester, copolymerization ratio and layer thickness.

6. The support for a roller light-sensitive photographic material of claim 1, wherein the mixture layer comprises 10 to 40% by weight of copolyester and the copolyester of the mixture layer is substantially the same as the copolyester of the primary component of at least one of the outer layers.

7. The support for a rolled light-sensitive photographic material of claim 6, wherein the thickness of each of the outer layers is 5 to 80 μm.

8. The support for a rolled light-sensitive photographic material of claim 7, wherein the thickness of each of outer layers is 15 to 60 μm.

9. The support for a rolled light-sensitive photographic material of claim 6, wherein the thickness of the outer layers is different from each other.

10. The support for a rolled light-sensitive photographic material of claim 9, wherein $1/5<T1/T2<2/3$ is satisfied, and in the formula, T1 is the thickness of the first outer layer having the small thickness and T2 is the thickness of the second outer layer.

11. The support for a rolled light-sensitive photographic material of claim 10, wherein $1/5<T1/T2<2/3$ is satisfied, and in the formula, T1 is the thickness of the first outer layer having the small thickness and T2 is the thickness of the second outer layer.

12. The support for a roller light-sensitive photographic material of claim 1, wherein the mixture layer is adjacent to at least one of the outer layers and comprises 10 to 40% by weight of copolyester and the copolyester of the mixture layer is substantially the same as the copolyester of the primary component of at least one of the outer layers adjacent to the mixture layer.

13. The support for a rolled light-sensitive photographic material of claim 1, wherein the thickness of each of outer layers is 5 to 80 μm.

14. The support for a rolled light-sensitive photographic material of claim 13, wherein the thickness of each of outer layers is 15 to 60 μm.

15. The support for a rolled light-sensitive photographic material of claim 1, wherein the thickness of the outer layers is different from each other.

16. The support for a rolled light-sensitive photographic material of claim 15, wherein $1/8<T1/T2<1$ is satisfied, and in the formula, T1 is the thickness of the first outer layer having the small thickness and T2 is the thickness of the second outer layer.

17. The support for a rolled light-sensitive photographic material of claim 16, wherein $1/5<T1/T2<2/3$ is satisfied, and in the formula, T1 is the thickness of the first outer layer having the small thickness and T2 is the thickness of the second outer layer.

18. The support for a rolled light-sensitive photographic material of claim 1, wherein the mixture layer comprises recovered polyester in an amount of 3 to 40 percent by weight.

19. The support for a rolled light-sensitive photographic material of claim 1, wherein the mixture layer comprises recovered polyester from two or more laminated layers, one of which is composed of copolyester and the other is composed of a mixture of copolyester and a polyester other than the copolyester in an amount of 3 to 40 percent by weight.

20. The support for a rolled light-sensitive photographic material of claim 1, wherein the difference in melt viscosity between laminated layers is not more than 50 percent.

21. The support for a rolled light-sensitive photographic material of claim 1, wherein the support has a magnitude of roll set curl after thermal treatment of not more than 135 $m^{-1}$, a magnitude of curl in warm water of not more than 50 $m^{-1}$, a degree of recovered curl after warm water treatment of not more than 40 $m^{-1}$ a magnitude of curl in the width direction of 3 to 20 $cm^{-1}$, a Young's modulus of 350 to 480 $kg/mm^2$, a Young's modulus immediately after immersion in water of at least 250 $kg/mm^2$, a loop stiffness of 10 to 30 g by weight, and a thermal shrinkage in the longitudinal direction of −0.5 to 3.0 percent.

* * * * *